United States Patent Office 2,717,904
Patented Sept. 13, 1955

2,717,904

BIS-QUATERNARY AMMONIUM BENZOATES

Carl Ziegler, Clementon, N. J., assignor to Merck & Co., Inc., a corporation of New Jersey No Drawing. Application August 30, 1952,
Serial No. 307,360

7 Claims. (Cl. 260—472)

This invention relates to new quaternary ammonium derivatives. More particularly, this invention relates to bis-quaternary ammonium compounds, and especially to new bis-quaternary ammonium compounds represented by the general formula:

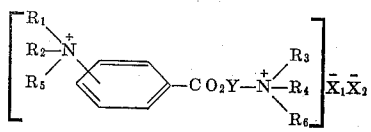

wherein $R_1$, $R_2$, $R_3$, and $R_4$, respectively, is a low molecular weight alkyl radical, and each can represent the same alkyl radical or one or more of the alkyl radicals can be different from the other alkyl radicals represented by these variable elements; $R_5$ and $R_6$, respectively, is a low molecular weight alkyl radical or aralkyl radical the alkyl portion of which is advantageously a low molecular weight alkyl radical, and $R_5$ and $R_6$ can represent the same or different radicals; Y is an alkylene group, either straight or branched chain, containing 3 to 6 carbon atoms; and $X_1$ and $X_2$, respectively, is an anion.

The bis-quaternary compounds of the above general formula possess curare-like activity. Particularly good curare-like activity is exhibited by those compounds of the above general formula wherein the quaternary ammonium radical is attached to the para-position carbon atom of the benzoic acid radical and Y is a straight or branched chain alkylene group containing from 3 to 6 carbon atoms. Of these compounds, those having 3 or 4 carbon atoms linked in sequence between the oxygen and nitrogen atoms have especially outstanding activity; optimum activity is exhibited by this latter group of compounds when Y contains 4 carbon atoms, all of which are linked in sequence between the oxygen and nitrogen atoms and especially by 4-trimethyl ammoniumbutyl para-trimethylammonium benzoate dihalide.

The bis-quaternary ammonium compounds of this invention can be prepared by several known procedures. Among the more practical methods that can be employed for their preparation are: (1) reacting a quaternary ammoniumbenzoyl halide with a quaternary ammoniumalkanol, advantageously in an inert solvent thus directly forming the desired bis-quaternary ammonium compound; (2) reacting a dialkylaminobenzoyl halide with a haloalkanol having an alkylene chain of the type desired for the group Y in the above general formula. This reaction results in a hydrohalide of a haloalkyl ester of dialkylaminobenzoic acid which, upon reaction with a secondary amine, forms the corresponding bis-tertiary amino derivative capable of conversion, by known methods, to the corresponding bis-quaternary ammonium compound; (3) reacting a tertiary aminobenzoyl halide with a tertiary aminoalkanol thus forming the corresponding bis-tertiary amino derivative which can be converted by known methods to the corresponding bis-quaternary ammonium compound; (4) esterification of a dialkylaminobenzoic acid with the selected tertiary aminoalkanol using a mineral acid as a catalyst thereby obtaining the bis-tertiary amino derivative which can be directly quaternized by known methods; (5) esterification of a quaternary ammoniumbenzoic acid with the desired quaternary ammoniumalkanol using a mineral acid as a catalyst thereby producing the desired bis-quaternary ammonium compounds of this invention; (6) reacting a tertiary aminobenzoic anhydride, preferably the para-tertiary aminobenzoic anhydride, with the selected tertiary aminoalkanol and quaternizing the end product thus obtained by known methods; or (7) reacting a tertiary aminobenzoic acid ester, advantageously a lower-alkyl ester of para-tertiary aminobenzoic acid, with a tertiary-aminoalkanol, preferably with heating, and quaternizing, by known methods, the end product thus obtained.

At the present time, the first, second and third methods described above appear to be most advantageous from the point of view of yield and ease of operation. Each of these methods will be described in detail in the following examples. In general, however, when method 1 is employed, the selected quaternary ammoniumbenzoyl halide is prepared by quaternizing, by known methods, the readily obtainable tertiary aminobenzoyl halide. The quaternary ammoniumalkanol can likewise be prepared by quaternizing a selected, readily obtainable tertiary aminoalkanol. Each of the quaternary ammonium compounds can be separated from its reaction mixture, although this is not necessary, and the quaternary ammoniumalkanol reaction mixture can be added directly to the quaternary ammoniumbenzoyl halide reaction mixture and the combined mixtures heated, advantageously on a steam bath, until evolution of hydrogen chloride ceases. The bis-quaternary ammonium compound can be separated by any desired method, such as concentration of the reaction mixture and filtration.

Method 2 is carried out substantially as described for it above. Best yields are obtainable if the reaction mixture containing the dialkylaminobenzoyl halide and the haloalkanol is cooled, for example by placing the reaction flask in an ice bath. The reaction also will take place at room temperature or with slight heating. The crude product obtained is then reacted with a secondary amine advantageously in the presence of an inert solvent and under pressure and the bis-tertiary-amino derivative thus produced is quaternized by known procedures.

Method 3 employs the readily obtainable benzoyl halides containing a tertiary-amino group attached to the benzene nucleus, advantageously in the para-position, and tertiary-aminoalkanols as starting materials. These intermediates are reacted, merely admixed one with the other or in the presence of a solvent, advantageously with the cooling, to form the hydrohalide salt of the bis-tertiary aminobenzoic acid ester. As the salts are usually crystalline substances they can, if desired, be separated from the reaction mixture before they are converted to the free base by conventional methods, for example, by treating the salt with a suitable strong alkali, such as sodium hydroxide. The free base is then reacted with at least 2 molecular equivalents of the selected quaternizing reagent to produce the desired bis-quaternary ammonium compounds of this invention.

Quaternizing reagents used in any one of the above methods, 1 through 7, are, advantageously, alkyl halides or aralkyl halides, preferable an alkyl bromide or an alkyl iodide or benzyl chloride or benzyl bromide or a substituted benzyl halide; an alkyl sulfate as methyl sulfate and the like; or an alkyl arylsulfonate, such as methyl para-toluenesulfonate and the like.

An alternate method for making bis-quaternary ammonium salts other than the dihalides comprises treating the bis-quaternary ammonium dihalide with silver oxide to produce the bis-quaternary ammonium dihydroxide. The excess silver oxide and precipitated silver halide is removed by filtration and the aqueous solution of bis-quaternary ammonium dihydroxide then is reacted with an appropriate acid to introduce the desired anion. A variety of anions such as the sulfate, phosphate, para-toluenesulfonate, acetate, propionate, benzoate, and in general the carboxylate anion of an organic acid can be introduced by this method.

It is to be noted, however, that variation of the anion has only a minimum effect on the properties of the novel compounds of this invention.

The bis-quaternary ammonium compounds of this invention crystallize from various solvents or combination of solvents in the form of solvates or combination of solvates. Thus, upon crystallization of a single compound from various solvents or solvent combinations, there may be obtained a variety of solvate forms having varying melting points. The amount of a particular solvent included in a solvate of a compound embraced by this invention varies from compound to compound. Because of the tendency of the bis-quaternary ammonium compounds to form solvates, their characterization by melting point is dependent upon the method of taking the melting point, the rate of heating, and the initial temperature of the melting point bath. The melting points of the compounds of this invention are therefore not reported herein.

The preferred methods for preparing the bis-quaternary ammonium compounds are illustrated in more detail by the following examples. It is to be understood, of course, that the invention is in no wise limited thereby.

PROCESS ACCORDING TO METHOD 1

*Example 1.—3-trimethylammoniumpropyl p-trimethyl-ammonium-benzoate diiodide*

Step A.—A mixture of 14 grams (0.1 mole) of methyl iodide, 9.2 grams (0.05 mole) of p-dimethylaminobenzoyl chloride and 200 ml. of acetone was heated under reflux for 3 hours on a steam bath.

Step B.—In another container, 5.0 grams (0.05 mole) of 3-dimethylaminopropanol dissolved in 25 ml. of acetone was cooled while 14 grams (0.1 mole) of methyl iodide was added. An immediate reaction gave a white crystalline precipitate. The cake was broken up to form a slurry.

Step C.—The slurry obtained in Step B then was added to the mixture resulting from Step A and heating was continued for another hour. Evolution of hydrogen chloride could be detected. The warm mixture was filtered and the filtrate was concentrated to a small volume (50 ml.). Upon cooling the product crystallized and was separated by filtration. There was obtained 6.7 grams of 3-trimethylammoniumpropyl p-trimethylammoniumbenzoate diiodide.

PROCESS ACCORDING TO METHOD 2

*Example 2.—3-trimethylammoniumpropyl p-trimethylammoniumbenzoate dimethylsulfate*

Step A.—To a solution of 13.9 grams (0.1 mole) of trimethylene bromohydrin in 50 ml. of reagent chloroform, there was added 18.4 grams (0.1 mole) of p-dimethylaminobenzoyl chloride in small portions while the solution was cooled in an ice bath. The solution became turbid. After standing for 4 hours, the reaction mixture was warmed on the steam bath to remove the solvent. The residue then was triturated with anhydrous ether and filtered. There was thus obtained about 28.5 grams of a crude solid melting below 100° C.

Step B.—This crude solid was dissolved in 100 ml. of 30% dimethylamine in alcohol in a pressure bottle. The reaction mixture was heated to 85–90° C. for an hour and then allowed to cool. The solvent was distilled on a steam bath and the residue dissolved in water, made strongly basic with a 20% solution of sodium hydroxide. An oil separated which was extracted with ether, the extract was dried, the solvent removed and the residue distilled. There was obtained 14.5 grams of 3-dimethylaminopropyl p-dimethylaminobenzoate, boiling point 160–161° C. at 0.5 mm. pressure $n_D^{25}$ 1.5580.

Step C.—A solution of the above obtained bis-tertiaryamine and an excess of 2 moles of methyl sulfate in about 25 ml. of alcohol was heated under reflux with vigorous stirring for about 48 hours. The reaction mixture then was cooled and concentrated yielding 3-trimethylammoniumpropyl p-trimethylammoniumbenzoate dimethylsulfate.

PROCESS ACCORDING TO METHOD 3

*Example 3.—3-trimethylammoniumpropyl para-trimethylammoniumbenzoate diiodide*

Step A.—To a solution of 10.3 grams (0.10 mole) of 3-dimethylaminopropanol in 50 ml. of reagent chloroform, there was added 18.4 grams (0.10 mole) of para-dimethylaminobenzoyl chloride in small portions while the solution was cooled in an ice bath. A vigorous reaction took place as the acid chloride dissolved. A crystalline solid separated on standing for a short time. After chilling the reaction mixture the solid was removed by filtration. This solid material is the hydrochloride of 3 - dimethylaminopropyl para - dimethylaminobenzoate which can be recrystallized from alcohol, M. P. 181–183° C.

Step B.—The hydrochloride obtained in Step A then was dissolved in 500 ml. of cold water. A 40% solution of sodium hydroxide was added until the solution was quite basic (pH 10–12). 3-dimethylaminopropyl para-dimethylaminobenzoate separated as an oil which was extracted with three 100 ml. portions of ether. The extract was dried over sodium sulfate. After removal of the sodium sulfate by filtration, the ether was removed by evaporation on a steam bath and the residue distilled. 18.7 grams of the free base was obtained, B. P. 160–161° C. at 0.5 mm. pressure $n_D^{25}$ 1.5580.

Step C.—A solution of 7.5 grams (0.03 mole) of 3-dimethylaminopropyl para-dimethylaminobenzoate and 42.6 grams (0.3 mole) of methyl iodide in 25 ml. of alcohol was heated under reflux with vigorous stirring for 48 hours. A crystalline product separated. The reaction mixture then was cooled and filtered. The solid material obtained was recrystallized from 90% alcohol, yield 8.5 grams of 3-trimethylammoniumpropyl para-trimethylammoniumbenzoate diiodide.

*Example 4.—3-benzyldimethylammoniumpropyl para-benzyldimethylammoniumbenzoate dibromide*

A mixture of 7.5 grams (0.03 mole) of 3-dimethylaminopropyl para-dimethylaminobenzoate (prepared by the process described in Examples 2–3), and 43 grams (0.24 mole) of benzyl bromide were warmed together on the steam bath for 15 minutes. A clear solution resulted, which, upon cooling to room temperature became a "glass." The "glass" was pulverized under ethyl acetate and then crystallized from isopropanol yielding 6.1 grams of 3-benzyldimethylammoniumpropyl para-benzyldimethylammoniumbenzoate dibromide.

*Example 5.—3-trimethylammoniumpropyl para-trimethylammoniumbenzoate di-para-toluenesulfonate*

Two and five-tenths grams (0.01 mole) of 3-dimethylaminopropyl para-dimethylaminobenzoate, prepared as described in Examples 2–3, were dissolved in 15 grams (0.08 mole) of methyl para-toluenesulfonate. The reaction mixture became quite warm and a product crystallized. The mixture was warmed on a steam bath for three hours, then cooled to room temperature. The solid product was removed by filtration and recrystallized from alcohol. Yield, 4.4 grams of 3-trimethylammoniumpropyl para-trimethylammoniumbenzoate di-para-toluenesulfonate.

*Example 6.—3-trimethylammoniumpropyl para-trimethylammoniumbenzoate dibromide*

To a solution of 5.0 grams (0.02 mole) of 3-dimethylaminopropyl para-dimethylaminobenzoate, prepared as described in Examples 2–3, in 10 ml. of alcohol cooled to 0° C. in a pressure bottle, there was added 15 ml. (25.9 grams, 0.26 mole) of methyl bromide at 0° C. The bottle was stoppered and allowed to come slowly to room temperature. A crystalline product separated after standing about two days, which, after separation by filtration and recrystallization from alcohol yielded 2.7 grams of 3-trimethylammoniumpropyl para-trimethylammoniumbenzoate dibromide.

*Example 7.—3-dipropylmethylammoniumpropyl para-trimethylammoniumbenzoate dibromide*

The compound was made by method 2 by substituting an equivalent quantity of dipropylamine for the dimethylamine employed in Step B of Example 2. The 3-dipropylaminopropyl p-dimethylaminobenzoate obtained boiled at 184–185° C. at 0.2 mm. pressure, $n_D^{25}$ 1.5385. The bis-tertiary amino derivative thus obtained was quaternized with methyl bromide by reaction with the quaternizing agent with cooling to about 0° C. in a pressure bottle. The reaction mixture then was allowed to come slowly to room temperature and remain at that temperature until a crystalline product separated. The crystalline 3-dipropylmethylammoniumpropyl para-trimethylammoniumbenzoate dibromide thus produced was obtained from the reaction mixture by filtration.

*Example 8.—3-dibutylmethylammoniumpropyl para-trimethylammonium benzoate dibromide*

This compound was also made by method 2 by substituting an equivalent quantity of dibutylamine for the dimethylamine employed in Step B of Example 2. The 3-dibutylaminopropyl p-dimethylaminobenzoate obtained boiled at 202–204° C. at 0.4 mm. pressure, $n_D^{25}$ 1.5320. The bis-tertiary amino derivative thus obtained was quaternized with methyl bromide by the procedure described in Example 7, yielding crystalline 3-dibutylmethylammoniumpropyl para-trimethylammonium benzoate dibromide.

*Example 9.—3-diethylmethylammoniumpropyl para-trimethylammonium benzoate dibromide*

This compound was prepared by method 3 by substituting an equivalent quantity of 3-diethylaminopropanol for the 3-dimethylaminopropanol employed in Step A of Example 3. By following substantially the same procedure described in Steps A and B of Example 3 there was obtained 3-diethylaminopropyl para-dimethylaminobenzoate boiling at 175–177° C. at 0.1 mm. pressure, $n_D^{25}$ 1.5513. This product was quaternized with methyl bromide by reaction with the quaternizing agent with cooling to about 0° C. in a pressure bottle. The reaction mixture then was allowed to come slowly to room temperature and remain at that temperature until a crystalline product separated. The crystalline 3-diethylmethylammoniumpropyl para-trimethylammonium benzoate dibromide thus produced was obtained from the reaction mixture by filtration.

*Example 10.—4-trimethylammonium-2-butyl para-trimethylammoniumbenzoate dibromide*

By substituting an equivalent quantity of 4-dimethylamino-2-butanol for the dimethylaminopropanol of Example 3, and following substantially the same procedure described in Steps A and B thereof, there was obtained 4-dimethylamino-2-butyl para-dimethylaminobenzoate, boiling point 160–163° C. at 0.8 mm. pressure, $n_D^{25}$ 1.5501. This product was treated with an excess of methyl bromide substantially as described in Example 9 yielding 4-trimethylammonium-2-butyl para-trimethylammoniumbenzoate dibromide.

An aqueous solution of 4-trimethylammonium-2-butyl para-trimethylammoniumbenzoate dibromide, obtained as described in Example 10, was treated with an excess of silver oxide to convert it to the water soluble dihydroxide derivative. After filtration, the filtrate was treated with acetic acid to form 4-trimethylammonium-2-butyl para-trimethylammoniumbenzoate diacetate.

*Example 11.—4-trimethylammoniumbutyl para-trimethylammoniumbenzoate dibromide*

This compound was also prepared by method 3 by substituting an equivalent quantity of 4-dimethylaminobutanol for the 3-dimethylaminopropanol employed in Step A of Example 3 and following substantially the same procedure outlined in Steps A and B thereof. The 4-dimethylaminobutyl para-dimethylaminobenzoate obtained boiled at 175–180° C. at 0.5 mm. pressure, $n_D^{25}$ 1.5538. The bis-tertiary amino derivative thus obtained was quaternized with methyl bromide as described in Example 7 thus producing 4-trimethylammoniumbutyl para-trimethylammonium benzoate dibromide.

*Example 12.—4-trimethylammoniumbutyl para-trimethylammoniumbenzoate di-para-toluenesulfonate*

Equivalent quantities of 4-dimethylaminobutanol (7.4 grams, 0.063 mole) and para-dimethylaminobenzoyl chloride (11.6 grams, 0.063 mole) were reacted in substantially the same as described in Step A of Example 3, yielding 18.8 grams of 4-dimethylaminobutyl para-dimethylaminobenzoate hydrochloride, which, after recrystallization from alcohol, melted at 189–192° C. When treated with concentrated sodium hydroxide, the free base is obtained, B. P. 80–85° C. at 0.1 to 0.2 micron, $n_D^{25}$ 1.5538. An immediate reaction producing a white crystalline precipitate occurred when 9.1 grams (0.035 mole) of the free base was added to 25 ml. of methyl para-toluenesulfonate. Upon gentle warming of the reaction mixture over an open flame, the precipitate went into solution, and upon cooling a crystalline product was again obtained. The reaction mixture then was triturated with ether and filtered. The solid residue after recrystallization from isopropanol, yielded 7.4 grams of 4-trimethylammoniumbutyl para-trimethylammoniumbenzoate di-para-toluenesulfonate.

*Example 13.—5-methyldiethylammonium-2-pentyl para-trimethylammoniumbenzoate diiodide*

By substituting 15.9 grams (0.1 mole) of 5-diethylamino-2-pentanol for the dimethylaminopropanol of Example 3, and following substantially the same procedure described in Steps A and B thereof, there was obtained 7.8 grams of 5-diethylamino-2-pentyl para-dimethylaminobenzoate, B. P. 178–180° C. at 0.5 mm. pressure, $n_D^{25}$ 1.5420.

A solution of 6.8 grams (0.022 mole) of the free base in 15 ml. of ethanol and 9.4 grams (0.066 mole) of methyl iodide was heated three hours on the steam bath. The solvent was removed by evaporation on a steam bath, and the residue allowed to stand until it crystallized. After recrystallization from a mixture of methanol and isopropanol, 5.8 grams of 5-methyldiethylammonium-2-pentyl para-trimethylammoniumbenzoate diiodide was obtained.

*Example 14.—5-trimethylammoniumpentyl para-trimethylammoniumbenzoate dibromide*

By substituting an equivalent quantity of 5-chloropentanol for the bromohydrin employed in Example 2, and following substantially the same procedure described therein, there was obtained 5-dimethylaminopentyl para-dimethylaminobenzoate, boiling point 186–187° C. at 0.8 mm. pressure, $n_D^{25}$ 1.5515. This bis-tertiary amino derivative was treated with an excess of methyl bromide by substantially the same process described in Example 7 yielding 5-trimethylammoniumpentyl para-trimethylammoniumbenzoate dibromide.

*Example 15.—6-trimethylammoniumhexyl para-trimethylammoniumbenzoate dibromide*

By substituting an equivalent quantity of 6-chlorohexanol for the bromohydrin employed in Example 2, and following substantially the same procedure described therein, there is obtained 6-dimethylaminohexyl para-dimethylaminobenzoate, boiling point 185–188° C. at 0.3 mm. pressure, $n_D^{25}$ 1.5445. This bis-tertiary amino derivative was treated with an excess of methyl bromide by substantially the same process described in Example 7 yielding 6-trimethylammoniumhexyl para-trimethylammoniumbenzoate dibromide.

An aqueous solution of 6-trimethylammoniumhexyl para-trimethylammoniumbenzoate dibromide, obtained as described in Example 15, was treated with an excess of silver oxide to convert it to the water soluble dihydroxide derivative. After filtration, the filtrate was separated into three portions and to each portion there was separately added an excess of 2 moles of hydrochloric acid, acetic acid, and benzoic acid, thus forming 6-trimethylammoniumhexyl para-trimethylammoniumbenzoate dichloride, 6-trimethylammoniumhexyl para-trimethylammoniumbenzoate diacetate, and 6-trimethylammoniumhexyl para-trimethylammoniumbenzoate dibenzoate respectively.

While the invention has been illustrated by reference to a number of specific embodiments of the invention, it will be apparent that many variations may be made in the specific procedures described and in the particular end products obtained and in the reactants and solvents specifically enumerated.

This invention is limited solely by the scope of the claims attached hereto.

What I claim is:

1. Compounds of the general formula

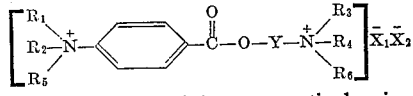

wherein $R_1$, $R_2$, $R_3$ and $R_4$, respectively, is a lower molecular weight alkyl radical; $R_5$ and $R_6$, respectively, is selected from the group consisting of lower molecular weight alkyl radicals and phenalkyl radicals the alkyl portion of which is derived from a low molecular weight alkyl radical; Y is an alkylene radical having from 3 to 6 carbon atoms and is selected from the group consisting of straight chain alkylene radicals and branched chain alkylene radicals; and $X_1$ and $X_2$, respectively, is a non-toxic anion.

2. Compounds of the general formula

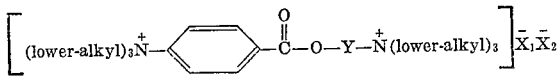

wherein Y is an alkylene radical having from 3 to 6 carbon atoms with from 3 to 4 carbon atoms linked in sequence between the oxygen and nitrogen atoms and is selected from the group consisting of straight chain alkylene radicals and branched chain alkylene radicals; and $X_1$ and $X_2$, respectively, is a non-toxic anion.

3. 3 - trimethylammoniumpropyl para - trimethylammoniumbenzoate dibromide.

4. 3 - trimethylammoniumpropyl para - trimethylammoniumbenzoate di-para-toluenesulfonate.

5. 4 - trimethylammoniumbutyl para - trimethylammoniumbenzoate dibromide.

6. 3-benzyldimethylammoniumproply para-benzyldimethylammoniumbenzoate dibromide.

7. 4-trimethylammonium-2-butyl para-trimethylammoniumbenzoate dibromide.

References Cited in the file of this patent

UNITED STATES PATENTS

| | | |
|---|---|---|
| 2,406,627 | Parker et al. | Aug. 27, 1946 |
| 2,456,556 | Cope | Dec. 14, 1948 |

FOREIGN PATENTS

| | | |
|---|---|---|
| 437,976 | Germany | Nov. 30, 1946 |

OTHER REFERENCES

Jensen et al., Acta Chemica Scandinavica, 2, 381–384 (1948).